Nov. 28, 1961 — L. SADEL — 3,010,365
EYEGLASS ATTACHMENT
Filed Sept. 26, 1956

INVENTOR.
LEO SADEL
BY Amster & Levy
ATTORNEYS

United States Patent Office 3,010,365
Patented Nov. 28, 1961

3,010,365
EYEGLASS ATTACHMENT
Leo Sadel, 219 W. 81st St., New York, N.Y.
Filed Sept. 26, 1956, Ser. No. 612,213
4 Claims. (Cl. 88—52)

The present invention relates to a device for constraining a pair of eyeglasses in position on the head of a wearer, and in particular to a retaining assembly employing ear-engaging clips which may be associated with a conventional pair of eyeglasses to confine the same in their normal supported position when the wearer is engaged in activity likely to dislodge the glasses. Advantageously, eyeglasses constructed in accordance with the present invention may be worn when engaged in sporting activities, such as swimming, golf, tennis and the like.

The conventional eyeglass frame includes temple members such as a pair of side bars each terminating in an ear-encircling member such as a curved ear piece which is adapted to be engaged about and behind the ears of a wearer. Normally, this type of construction serves adequately to support and maintain the eyeglasses in position. However, when the wearer is engaged in extreme physical activity, such as participating sports, it is quite frequently the case that the eyeglasses become dislodged from their proper position and fall off. To avoid this risk, many people who normally wear glasses, remove the same when engaged in sport activities. A number of different devices have been suggested to obviate this difficulty, but for reasons which will appear hereinafter, have not met with too widespread acceptance. Typical of these devices is a band which is adapted to encircle the head of the wearer and engage the eyeglass frame to fix the same in position. This is not only unsightly, but also is uncomfortable.

Broadly, it is an object of the present invention to provide an improved device which obviates one or more of the aforesaid difficulties. Specifically, it is within the contemplation of the present invention to provide holder members in the form of clips which may be releasably attached to an eyeglass frame and arranged to engage the ears of the wearer to maintain the eyeglasses in position on the head of the wearer.

In accordance with an illustrative embodiment demonstrating features of the present invention, there is provided in combination with a conventional eyeglass frame including curved ear pieces adapted to be engaged about and behind the ears of a wearer, respective means on the terminal ends of the ear pieces which define sockets each having a partially constricted entry end. Associated with each ear piece is a lobe-encircling holder member which is adapted to curve around and above the lobule or fleshy ear lobe of the wearer, and which has a resilient tip formed to hook back on and engage the anti-tragus, the protruding cartilaginous shelf above the lobule from which the latter depends. The ear piece resiliently engages the undersurface of the anti-tragus opposite the tip of the holder member to grip the anti-tragus therebetween with a resilient clipping action. These holder members are rotatably and releasably attached to the respective socket members so that they may be brought into position to engage the ears of the wearer at times when the wearer intends to be very active. When the wearer does not expect to require the additional security, the clips may be either removed altogether or else rotated to a position behind the ears wherein the clips are substantially hidden from view.

As a feature of the present invention, the clips, which function as a safety device, may be ornamented with depending earring bodies or pendants, to adapt the clips for use by feminine wearers. Thus when in use, suitably ornamented clips may serve functionally as a protective device against inadvertent displacement of the eye glasses from the head of the female wearer and as ornamentation, much like conventional earrings.

The above brief description, as well as further objects, features and advantages of the present invention, will be best appreciated by reference to the following detailed description of presently preferred embodiments, when taken in conjunction with the accompanying drawings, wherein.

Figure 1:
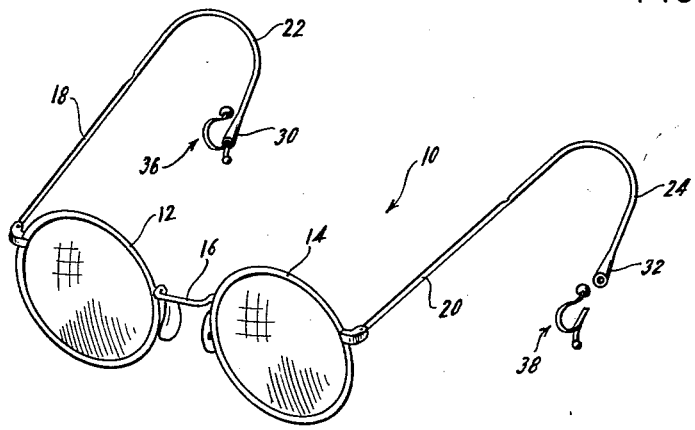
FIG. 1 is a perspective view of a pair of eyeglasses embodying features of the present invention.
Figure 2:
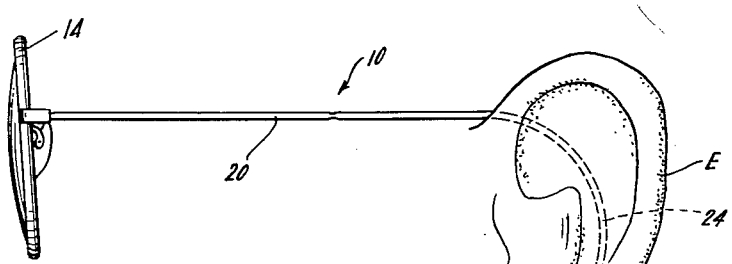
FIG. 2 is a side elevational view of the eyeglasses illustrated in FIG. 1, shown assembled on the head of the wearer with the ear-engaging clip of the present invention engaged about the lobe portion of the wearer's ear.

Referring now specifically to the drawings, there is shown in FIGS. 1 and 2 a pair of eyeglasses, generally designated by the reference numeral 10, which incorporates lens-supporting frames 12, 14 joined by a nose piece 16 and temple bars 18, 20 terminating respectively in curved ear-encircling pieces 22, 24 which are adapted to be engaged about and behind the ears E of a wearer.

In accordance with the present invention, socket-forming members 30, 32 are provided on the terminal portions of the respective ear pieces 22, 24. Since both of the socket-forming members are of identical structure, only one will be described in detail. As seen best in FIG. 3, the socket-forming member 32 is of general frusto-conical configuration and is of diminishing cross section from its foremost or leading end 32a to its trailing end 32b. A substantial portion of the socket-forming member 32 is engaged over the terminal portion of the curved ear piece 24 to provide a firm mount for the socket-forming member 32. Such mounting may be by a force fitting, soldering or other conventional mode of joining the metallic socket-forming member 32 to the adjacent ear piece. At its leading end 32a, the socket-forming member is turned inwardly to form a constriction defining an entry opening 34 which is circular and somewhat smaller in diameter than the adjacent socket diameter. Although the socket-forming member has been illustrated as a separate part joined to the adjacent ear piece, it is equally within the contemplation of the present invention to integrally form the socket having the entry end of diminished section on the ear piece.

Figure 3:
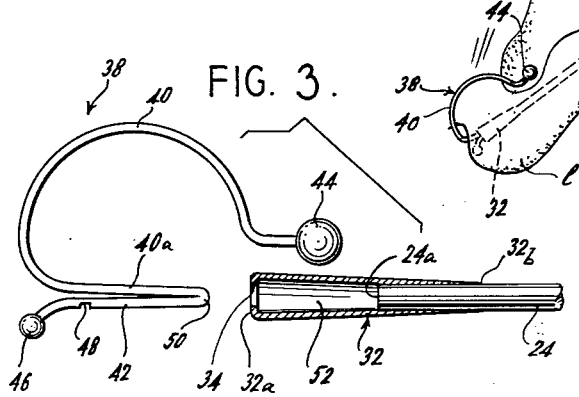
FIG. 3 is an enlarged exploded view, partially in section, showing an ear-engaging clip in position for assembly with a socket member on the curved ear piece at one side of the pair of glasses.

Associated with the respective ear pieces 22, 24 and the socket-forming members 30, 32 are holder clips 36, 38. The two holder clips are of similar structure. As seen in FIG. 3, the clip 38 includes a lobe-encircling member or section 40 having a latch piece 42 at one end thereof and a rearwardly extending ear-engaging resilient tip 44 at the other end thereof. The lobe-encircling member 40 is constructed and dimensioned to curve around and above the lobe portion of the wearer's ear, as illustrated in FIG. 2, and to bring the tip 44 into the ear cavity or concha, to resiliently engage the upper surface of the tough, cartilaginous anti-tragus which projects between the concha and the depending lobule. The tip 44 extends generally rearwardly into opposable relation to the lower part of ear-encircling piece 24, which is seen in FIG. 2 to engage the underside of the anti-tragus opposite to the tip 44. Thus these opposed members clip onto the anti-tragus interposed therebetween with a resilient gripping action. The latch piece 42, which is illustrated as being integral with the lobe-encircling member 40, extends adjacent to and forms a projection with the straight portion 40a of the lobe-encircling member 40 and terminates in a finger piece 46. The latch piece is formed on its side remote from the straight portion 40a of the lobe-encircling member with a detent 48 which is adapted to be engaged with the constriction formed by inturned end 32a of the socket-forming member 32, serving as a keeper, for securing the holder clip 38 on the member 32. The latch piece 42 is as previously indicated an integral part of the lobe-encircling member and is of springy or resilient material so that it may be urged toward the adjacent straight portion 40a of the lobe-encircling member 40. The parts 40a, 42 are in slightly convergent relation and make a small acute angle therebetween.

Figure 4:
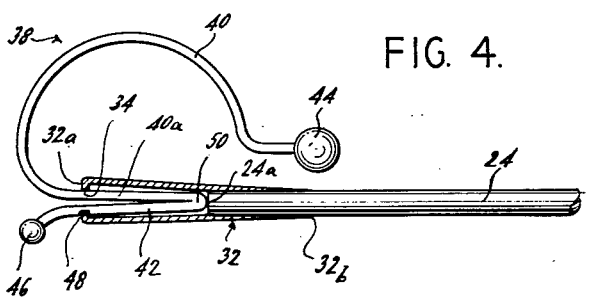
FIG. 4 is a view similar to FIG. 3, but showing the ear-engaging clip in assembled relation with the socket member on the ear piece; and, FIG. 5 is a fragmentary view of a modified ear-engaging clip embodying further features of the present invention.

The entry opening 34 of the socket-forming member 32 is of an extent comparable to the section at the leading end 50 of the projection formed by converging parts 40a, 42. Thus, the leading end 50 may be inserted axially through the opening 34 into the socket 52 defined by the member 32. In response to such insertion, the latch piece 42 and the straight section 40a are cammed toward each other until the detent 48 of the latch piece is opposite the constriction formed by inturned end 32a of the member 32, which serves as a keeper. In this position, the constriction or inturned end 32a will engage within the detent 48 with a snap action to maintain the holder clip 38 in assembly with its support. The assembled position is seen clearly in FIG. 4 wherein the inturned constriction 32a is engaged within the detent 48 and the portions of the projection 40a, 42 between the leading end 50 and the detent 48 are received within the socket 52. When so supported, the clip 38 may be pivoted by rotating the projection 40a, 42 in the socket 52 whereby the clip proper may be made to rotate about the ear-encircling piece 24 to extend above or below the ear piece. Thus, it is possible to have the clip 38 in the position illustrated in FIG. 2 wherein the same is engaged with the wearer's ear or to retract the clip to a position underlying the lobe portion 1 and generally beneath the ear piece 24.

For a more thorough understanding of the present invention, a typical use will be described in detail:

The frames of a conventional pair of eyeglasses are provided with separate or integral socket-forming members 30, 32. A pair of clips 36, 38 are thereupon engaged in the respective sockets, each clip then being supported as an extension of the supporting curved ear piece, but being rotatable about the terminal portion as an axis.

The wearer then places the glasses in position, with the curved ear pieces engaged behind the ears. At such time when extreme physical activity is contemplated, it is but a simple matter to rotate the respective clips 36, 38 to the position wherein they encircle the lobe portion 1 and clip onto the anti-tragus of each ear, as illustrated in FIG. 2. Experience indicates that the wearer may swim, play tennis, and engage in similar activity without the risk or fear of dislodging the glasses as a result of such activity.

Figure 5:
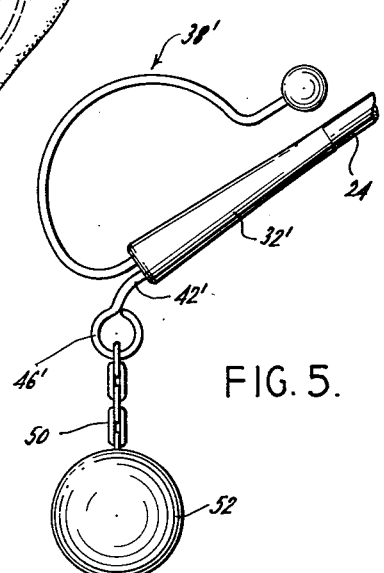

In FIG. 5 there is shown a modified ear clip which is particularly adapted for use by a feminine wearer. The modified ear clip is similar in construction to the clips 36, 38 and accordingly is designated by the reference numeral 38'. In lieu of the solid finger piece 46, there is provided an eyelet 46' which serves as the finger piece for the latch 42' and as a support for a chain 50 carrying a pendant or earring body 52. It will be appreciated that a wide variety of ornamentation may be applied to the modified ear clip 38' by attachment of appropriate adornment at the eyelet 46'. When engaged on the ears of the wearer, as illustrated in FIG. 2, attractive ornamentation is provided without detracting from the primary function of the clips.

A latitude of modification, change and substitution is intended in the foregoing disclosure. In some instances certain features will be used without a corresponding use of other features. Accordingly, the appended claims should be construed broadly and in a manner consistent with the spirit and scope of the invention.

What I claim is:

1. A retaining assembly for retaining a pair of eyeglasses on the head of a wearer, said eyeglasses including a temple member extending rearwardly therefrom whereby to engage an upper portion of the wearer's ear, said retaining assembly comprising an ear-encircling member, means mounting said ear-encircling member at the rear of said temple member, said ear-encircling member projecting downwardly therefrom and terminating in a lower end, said ear-encircling member having a length selected in relation to the dimensions of the wearer to extend behind the wearer's ear and for said lower end to be positioned at the height of the lobule of the wearer's ear, said lower end extending sufficiently far forwardly to be positioned inwardly of the lobule of the wearer's ear, a holder member, means mounting said holder member on said lower end for rotation thereabout between a position inward of the lobule of the wearer's ear whereby to hide said holder member behind the lobule when not in use and an ear-engaging position, said holder member when in said ear-engaging position projecting sufficiently far forwardly and upwardly from said lower end to pass around and above the lobule of the wearer's ear and terminating in a rearwardly extending tip positioned to engage the anti-tragus of the wearer's ear.

2. A retaining assembly for retaining a pair of eyeglasses on the head of a wearer, said eyeglasses including a temple member extending rearwardly therefrom whereby to engage an upper portion of the wearer's ear, said retaining assembly comprising an ear-encircling member, means mounting said ear-encircling member at the rear of said temple member, said ear-encircling member projecting downwardly therefrom and being of sufficient length to extend behind the wearer's ear and toward a lower portion thereof and terminating in a lower end, a holder member, means removably mounting said holder member on said lower end, said holder member projecting sufficiently far forwardly and upwardly therefrom to pass around and above the lobule of the wearer's ear and terminating in a rearwardly extending tip positioned to engage the anti-tragus of the wearer's ear.

3. A retaining assembly for retaining a pair of eyeglasses on the head of a wearer, said eyeglasses including a temple member extending rearwardly therefrom whereby to engage an upper portion of the wearer's ear, said retaining assembly comprising an ear-encircling member, means mounting said ear-encircling member at the rear of said temple member, said ear-encircling member projecting downwardly therefrom and terminating in a lower end, said ear-encircling member having a length selected in relation to the dimensions of the wearer to extend behind the wearer's ear and for said lower end to be positioned at the height of the lobule of the wearer's ear, said lower end extending sufficiently far forwardly to be positioned inwardly of the lobule of the wearer's ear, a holder member, attachment means removably mounting said holder member on said lower end for rotation thereabout between a position inward of the lobule of the wearer's ear whereby to hide said holder member behind the lobule when not in use and an ear-engaging position, said holder member when in said ear-engaging position projecting sufficiently far forwardly and upwardly from said lower end to pass around and above the lobule of the wearer's ear and terminating in a rearwardly extending tip positioned to engage the anti-tragus of the wearer's ear, said attachment means including a socket of substantially circular cross-section at the lower end of said ear-encircling member and a cooperating projection on said holding means sized for reception and rotation within said socket, said socket being formed with an annular constriction sized and positioned to retain said projection therein, said projection being laterally compressible for insertion and withdrawal past said constriction and being resilient for subsequent expansion to normal size for retention by said constriction, said projection being formed with a detent sized and positioned to receive said constriction upon insertion and expansion of said projection.

4. A retaining assembly for retaining a pair of eyeglasses on the head of a wearer, said eyeglasses including a temple member extending rearwardly therefrom whereby to engage an upper portion of the wearer's ear, said retaining assembly comprising an ear-encircling member, means mounting said ear-encircling member at the rear of said temple member, said ear-encircling member projecting downwardly therefrom and terminating in a lower end, said ear-encircling member having a length selected in relation to the dimensions of the wearer to extend behind the wearer's ear and for said lower end to be positioned at the height of the lobule of the wearer's ear, said lower end extending sufficiently far forwardly to be positioned inwardly of the lobule of the wearer's ear, a holder member, attachment means removably mounting said holder member on said lower end for rotation thereabout between a position inward of the lobule of the wearer's ear whereby to hide said holder member behind the lobule when not in use and an ear-engaging position, said holder member when in said ear-engaging position projecting sufficiently far forwardly and upwardly from said lower end to engage the wearer's ear, said attachment means including a socket of substantially circular cross-section at the lower end of said ear-encircling member and a cooperating projection on said holding means sized for reception and rotation within said socket, said socket being formed with an annular constriction sized and positioned to retain said projection therein, said projection being laterally compressible for insertion and withdrawal past said constriction and being resilient for subsequent expansion to normal size for retention by said constriction, said projection being formed with a detent sized and positioned to receive said constriction upon insertion and expansion of said projection.

References Cited in the file of this patent

UNITED STATES PATENTS

| | | |
|---|---|---|
| 1,264,295 | Greene | Apr. 30, 1918 |
| 1,533,190 | Jirasek | Apr. 14, 1925 |
| 1,806,464 | Housley | May 19, 1931 |
| 2,766,541 | Quinones et al. | Oct. 16, 1956 |

FOREIGN PATENTS

| | | |
|---|---|---|
| 186,003 | Great Britain | Sept. 21, 1922 |
| 261,315 | Great Britain | Nov. 18, 1926 |